Jan. 17, 1928.

C. M. CHAMBERLAIN 1,656,419

ADJUSTING MEANS FOR SPOTLIGHTS

Filed Oct. 12, 1923

Inventor
C. M. Chamberlain.
By
Attorney

Patented Jan. 17, 1928.

1,656,419

UNITED STATES PATENT OFFICE.

CLARENCE M. CHAMBERLAIN, OF DENVER, COLORADO, ASSIGNOR TO THE CLYMER MANUFACTURING COMPANY, OF DENVER, COLORADO, A CORPORATAION OF COLORADO.

ADJUSTING MEANS FOR SPOTLIGHTS.

Application filed October 12, 1923. Serial No. 668,100.

This invention relates to improvements in spotlights and has special reference to an adjustable windshield spotlight, which is provided with a stop that limits the upward inclination of the light when it is directed in a forward direction.

It has been found from experience that the ordinary lighting equipment furnished as standard equipment on the ordinary automobiles, and consisting of stationary headlights and cowl lights, is insufficient for proper service, as it is often desirable and sometimes essential to the safety of the driver and his passengers that light shall be projected onto places that cannot be illuminated by the ordinary headlights.

As an auxiliary illuminating device, there has been extensively employed a small, but powerful light attached to the windshield frame and within easy reach of the occupants of the car, who may turn the light in any direction desired. These lights have become known as "spotlights".

One type of spotlight that has lately been commercialized, projects through an opening in the windshield itself and is mounted in such a manner that it can be directed to any point within a certain radius. It is to spotlights of this specific type that my improvement relates.

In various parts of the country, the laws prescribe the height to which light rays from an automobile lamp can extend at a given distance in front of the car. A spotlight which is designed for universal adjustment, will, of course, not comply with the requirements of such a law.

It is the object of this invention to combine with a windshield spotlight an adjustable stop which can be moved to such a position that the spotlights to which it is secured can be made to comply with any law, however drastic.

The invention can be best described and understood if reference is had to the accompanying drawing in which a lamp is shown equipped with my adjustable stop.

In the drawings.

The same reference characters will be used to indicate the same parts throughout the several views.

Figures 1, 2:
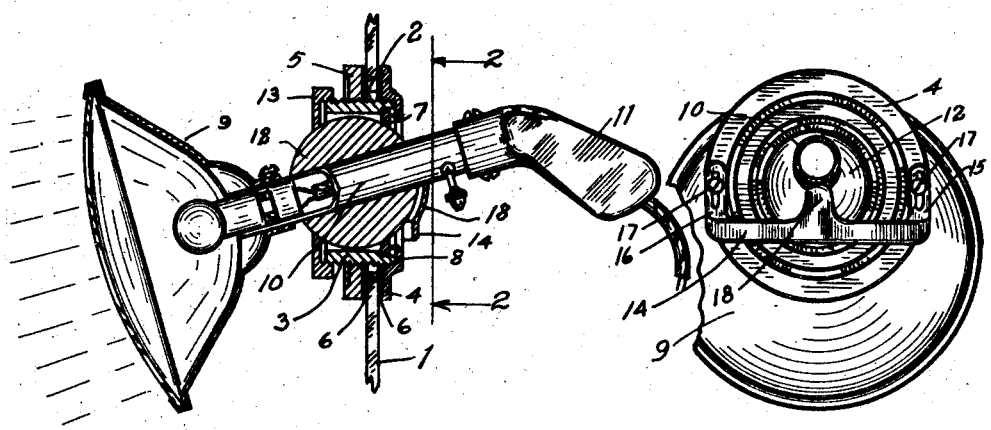
Fig. 1 is a longitudinal vertical section through a windshield spotlight equipped with my adjustable stop.
Fig. 2 is a section taken on line 2—2, Fig. 1.
Figures 3, 4:
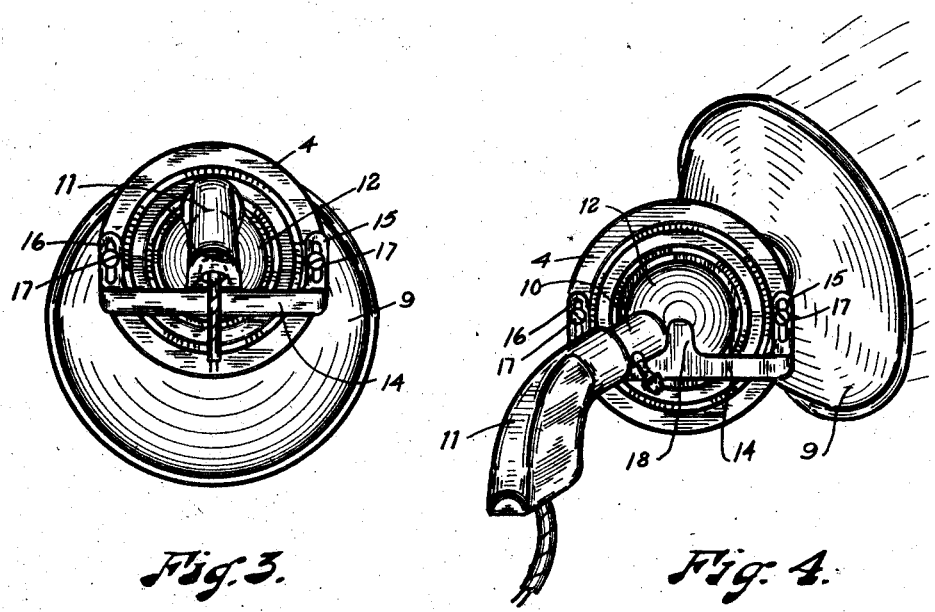
Fig. 3 is a rear elevation showing the lamp in central position.
Fig. 4 is a rear elevation showing the lamp in a position for throwing the light upwardly and to the right.

Numeral 1 indicates the windshield of an automobile, which is provided with a circular opening 2 for the reception of a mounting which consists of a tubular outwardly threaded member 3 having an outwardly projecting flange 4 at one end. A circular nut 5 is threaded onto the tubular member 3 and serves as a means for clamping the mounting to the windshield. Rubber washers 6 separate the sides of the windshield from the metal surfaces of the flange 4 and the nut 5. A ring 7 is held in an interior rabbet in the tubular member by the action of the inwardly extending flange 8. The lamp reflector 9 is secured to one end of a tubular stem 10, to the other end of which is attached a pistol-grip handle 11. Between the reflector 9 and the handle 11 is a spherical portion 12 that fits within the tubular member 3 in the manner shown in Fig. 1. A cap 13 is threadedly connected with member 3 and serves to hold the spherical part in place between itself and the ring 7. It will be apparent from the above description, taken in connection with the drawing, that the lamp can be moved into any direction and that it has a universal movement with respect to the windshield. The law requires that the lamp shall not be capable of projecting light rays in an upward direction when the lamp points directly ahead. For the purpose of limiting the movement of the lamp a stop has been provided. This stop consists of a bar 14 having its ends 15 and 16 bent at right angles to the transverse portion. The ends 15 and 16 are slotted, as shown, and are secured to the flange 4 by means of screws 17. Centrally of the transverse portion, is an upward projection 18. The stem 10 cannot be moved downwardly to a greater extent than that permitted by the bar 14 and the projection 18. When the lamp is pointed in a forward direction, the stem will rest on top of the projection 18 in the manner shown in Figs. 1, 2 and 3, and as a result the lamp will throw its rays in a downward direction. By adjusting the position of the bar in a vertical direction, the extent of the angular inclination of the lamp can be varied to suit the requirements of the law where the lamp is used. When the light is thrown to either side, the stem may move downwardly beside the projection 18 until it contacts with the bar 14.

From the above, it is apparent that I have provided a lamp of the type described with an adjusting means which will positively prevent the lamp from being tilted in an upward direction to such an extent that the same will come within the legal prohibitions.

Having now described my invention, what I claim is:

1. In combination, a windshield having an opening, a housing secured to the windshield at said opening, a spotlight device mounted for universal movement in said housing, a bar applied to said housing and having a central projection for limiting the tilting action of said device when directed in the line of travel, said bar having its ends slotted in substantially parallel relation with the said projection for purposes of adjustment.

2. In combination, an upright support having an opening, a housing secured to the support around said opening, a spotlight mounted for universal movement in said housing, a bar applied to the housing and having a central projection for limiting the tilting action of the device when parallel with the line of travel, the ends of the bar having projections substantially parallel with the central projection, and slotted to receive set-screws for purposes of adjustment.

3. A spotlight support comprising a mounting having a central opening, a stem projecting through said opening, means permitting universal movement between the stem and the mounting, a lamp on one end of the stem, a handle on the other end of the stem, means secured to the mounting for limiting the tilting of the stem in one direction, said means comprising a bar having its ends bent at right angles and provided with slots, screws passing through the slots and into the mounting for holding the bar in place, said bar having a central upward projection intersecting the normal horizontal plane of the stem.

4. In combination, a windshield having an opening, a mounting in said opening, a stem within said mounting, means in said mounting whereby said steam may be moved universally, a lamp connected to said stem and projecting forwardly therefrom, a handle connected to said stem on the opposite side of said means, and a member secured to said mounting and projecting transversely of the axis of said opening and having a substantially central upward projection in a plane intersecting the stem for limiting the tilting of the stem below a predetermined position.

In testimony whereof I affix my signature.

CLARENCE M. CHAMBERLAIN.